United States Patent
Yoo

(10) Patent No.: US 10,101,439 B2
(45) Date of Patent: Oct. 16, 2018

(54) APPARATUS AND METHOD FOR CONTROLLING POWER OF VEHICLE RADAR

(71) Applicant: HYUNDAI MOBIS CO., LTD., Seoul (KR)

(72) Inventor: Kang Hyun Yoo, Yongin (KR)

(73) Assignee: HYUNDAI MOBIS CO., LTD, Seoul (KR)

(*) Notice: Subject to any disclaimer, the term of this patent is extended or adjusted under 35 U.S.C. 154(b) by 308 days.

(21) Appl. No.: 14/789,768

(22) Filed: Jul. 1, 2015

(65) Prior Publication Data
US 2016/0131740 A1 May 12, 2016

(30) Foreign Application Priority Data

Nov. 12, 2014 (KR) .................. 10-2014-0157154

(51) Int. Cl.
*G01S 7/35* (2006.01)
*G01S 13/93* (2006.01)
(Continued)

(52) U.S. Cl.
CPC ............... *G01S 7/35* (2013.01); *G01S 7/023* (2013.01); *G01S 7/4004* (2013.01); *G01S 13/34* (2013.01); *G01S 13/931* (2013.01)

(58) Field of Classification Search
CPC ... G01S 7/02; G01S 7/023; G01S 7/35; G01S 7/40; G01S 7/4004; G01S 13/02; G01S 13/06; G01S 13/08; G01S 13/32; G01S 13/34; G01S 13/88; G01S 13/93; G01S 13/931; G01S 7/022; G01S 7/04;
(Continued)

(56) References Cited

U.S. PATENT DOCUMENTS 3,579,238 A * 5/1971 Haeff ................. G01S 7/38
264/5
4,097,863 A * 6/1978 Chambers .............. G01S 7/064
342/175
(Continued)

FOREIGN PATENT DOCUMENTS

JP 2009-264952 A 11/2009

OTHER PUBLICATIONS

Merrill I. Skolnik, "Introduction to Radar Systems," second edition; McGraw-Hill Book Company; New York, NY, USA; p. 75 with Figure 3.4; copyright year 1980; ISBN 0-07-057909-1.*

*Primary Examiner* — Bernarr E Gregory

(57) ABSTRACT

The present invention suggests a power control apparatus and method of a vehicle which switch the switching frequency component generated in the power supply module to odd-number times of a Nyquist frequency which is the most ignorable in the frequency domain which is used for the FMCW radar, thereby preventing the erroneous detection due to the switching frequency in the FMCW. The present invention provides a power control apparatus of a vehicle radar, including: a first frequency signal generating unit which generates a first frequency signal with a predetermined amplitude; a second frequency signal obtaining unit which converts a frequency value of the first frequency signal to obtain a second frequency signal; and a power supply control unit which controls the power to operate a vehicle radar based on the second frequency signal.

13 Claims, 7 Drawing Sheets

(51) Int. Cl.
    *G01S 13/34* (2006.01)
    *G01S 7/02* (2006.01)
    *G01S 7/40* (2006.01)
    *G01S 13/00* (2006.01)

(58) Field of Classification Search
    CPC ... G01S 7/06; G01S 7/064; G01S 7/28; G01S 7/282; G01S 7/38; H04B 15/06; H02M 1/12; H02M 3/155; H02M 1/44
    See application file for complete search history.

(56) References Cited

U.S. PATENT DOCUMENTS

| | | | |
|---|---|---|---|
| 4,190,882 A * | 2/1980 | Chevalier et al. | H02M 1/44 |
| 5,287,111 A * | 2/1994 | Shpater | G01S 7/282 |
| | | | 342/173 |
| 7,079,073 B2 | 7/2006 | Fujita | |
| 7,142,441 B2 * | 11/2006 | Mitrosky et al. | H02M 1/12 |
| 7,957,488 B2 * | 6/2011 | Hiramoto | H04B 15/06 |
| 2004/0140926 A1 * | 7/2004 | Nakamura | G01S 7/02 |
| | | | 342/70 |
| 2012/0249354 A1 * | 10/2012 | Kim | G01S 7/022 |
| | | | 342/20 |

* cited by examiner

APPARATUS AND METHOD FOR CONTROLLING POWER OF VEHICLE RADAR

CROSS-REFERENCE TO RELATED APPLICATIONS

This application claims priority to and the benefit of Korean Patent Application No. 10-2014-0157154 filed in the Korean Intellectual Property Office on Nov. 12, 2014, the entire contents of which are incorporated herein by reference.

TECHNICAL FIELD

The present invention relates to an apparatus and a method for controlling a power which is supplied to a radar system, and more particularly, to an apparatus and a method for controlling a power which is supplied to a vehicle radar system.

BACKGROUND ART

According to the related art, since a bandwidth of a frequency domain used in the vehicle radar system is not so broad, a component of a switching frequency generated in a power supply module does not cause a problem.

However, in recent years, as a usable bandwidth is gradually increased, the switching frequency is included in a frequency domain used in a frequency modulated continuous wave (FMCW) radar, which may cause a problem.

In order to solve the above-mentioned problem, U.S. Pat. No. 7,079,073 discloses a method which shifts a switching frequency component of a power supply device of an FMCW radar into an assignable band to move the switching frequency component to the outside of a frequency domain where data exists, thereby avoiding a noise.

However, the above method has the following problems:

First, in order to change a switching frequency, a switching signal output module which includes a clock generator and a frequency setter as hardware is required. Since a mixer and a local oscillator (LO) which outputs various frequencies are further required, adverse influences such as an increased size of the hardware, an increased material cost, and increased complexity are generated.

Second, when a maximum value of a Nyquist frequency and a maximum value of a beat frequency are equal to each other, the switching frequency is unconditionally shifted only to $f_N$. However, in this case, only a part of a function of the switching signal output module is used, so that the other part may be wasted. In an actual system, the maximum value of the Nyquist frequency and the maximum value of the beat frequency are equal to each other in many cases and a width of allocation bands is narrow.

Third, the method used an aliasing bands may vulnerable to Electro Magnetic Compatibility (EMC) than the method used the lowest specific band.

SUMMARY OF THE INVENTION

The present invention has been made in an effort to provide a power control apparatus and a method of a vehicle radar which moves a switching frequency component generated in a power supply module to an odd number multiple of a Nyquist frequency which is the least problematic in a frequency domain which is used by an FMCW radar to prevent erroneous detection due to the switching frequency in the FMCW radar.

However, an object of the present invention is not limited to the above description and other objects which have not been mentioned above will be more apparent to those skilled in the art from a reading of the following description.

An exemplary embodiment of the present invention provides a power control apparatus of a vehicle radar, including: a first frequency signal generating unit which generates a first frequency signal with a predetermined amplitude; a second frequency signal obtaining unit which converts a frequency value of the first frequency signal to obtain a second frequency signal; and a power supply control unit which controls a power source to operate a vehicle radar based on the second frequency signal.

The first frequency signal generating unit may configure the vehicle radar and may be provided in a signal processor which processes frequency signals generated in the vehicle radar or provided separately from the vehicle radar.

The first frequency signal generating unit may be a clock source for sampling an analog to digital converter which configures the vehicle radar.

The second frequency signal obtaining unit may divide or multiply the frequency to convert the frequency value of the first frequency signal to generate sampling frequencies and obtain the second frequency signal.

The second frequency signal obtaining unit may divide the frequency value of the first frequency signal at odd number times or multiply the frequency value at the odd number times to generate the sampling frequencies.

The second frequency signal obtaining unit may generate a Nyquist frequency with the sampling frequencies.

The second frequency signal obtaining unit may detect intermediate frequencies having an intermediate value between the maximum value and the minimum value among the sampling frequencies and obtain the second frequency signal based on the frequency having the minimum value among the intermediate frequencies.

Further, another exemplary embodiment of the present invention provides a power control method of a vehicle radar, including: generating a first frequency signal with a predetermined amplitude; converting a frequency value of the first frequency signal to obtain a second frequency signal; and controlling a power supply to operate a vehicle radar based on the second frequency signal.

The generating may include generating the first frequency signal using a clock source for sampling an analog to digital converter which configures the vehicle radar.

The obtaining may include dividing or multiplying the frequency to convert the frequency value of the first frequency signal to generate sampling frequencies and obtain a second frequency signal.

The obtaining may include dividing the frequency value of the first frequency signal at odd number times or multiplying the frequency value at the odd number times to generate the sampling frequencies.

The obtaining may include generating a Nyquist frequency with the sampling frequencies.

The obtaining may include detecting intermediate frequencies having an intermediate value between the maximum value and the minimum value among the sampling frequencies and obtaining the second frequency signal based on the frequency having the minimum value among the intermediate frequencies.

According to the exemplary embodiment, the following effects may be obtained by moving a switching frequency component generated in a power supply module to an odd-number multiple of the Nyquist frequency which is the least problematic in a frequency domain which is used in an FMCW radar.

First, erroneous detection due to the switching frequency is not generated in the FMCW radar, so that a detection performance may be improved.

Second, the methods of the related art further require an element for generating an additional frequency and a module for selecting the frequency, but in the present invention, there is no need to provide an element for generating a frequency, which contributes to reduce the number of parts.

Third, when one radar is used to perform various functions, the switching frequency for products in accordance with the individual functions may be changed. However, the present invention automatically changes the switching frequency of the power supply module, so that the production cost may be reduced through mass production.

DETAILED DESCRIPTION OF THE INVENTION

Figure 1:
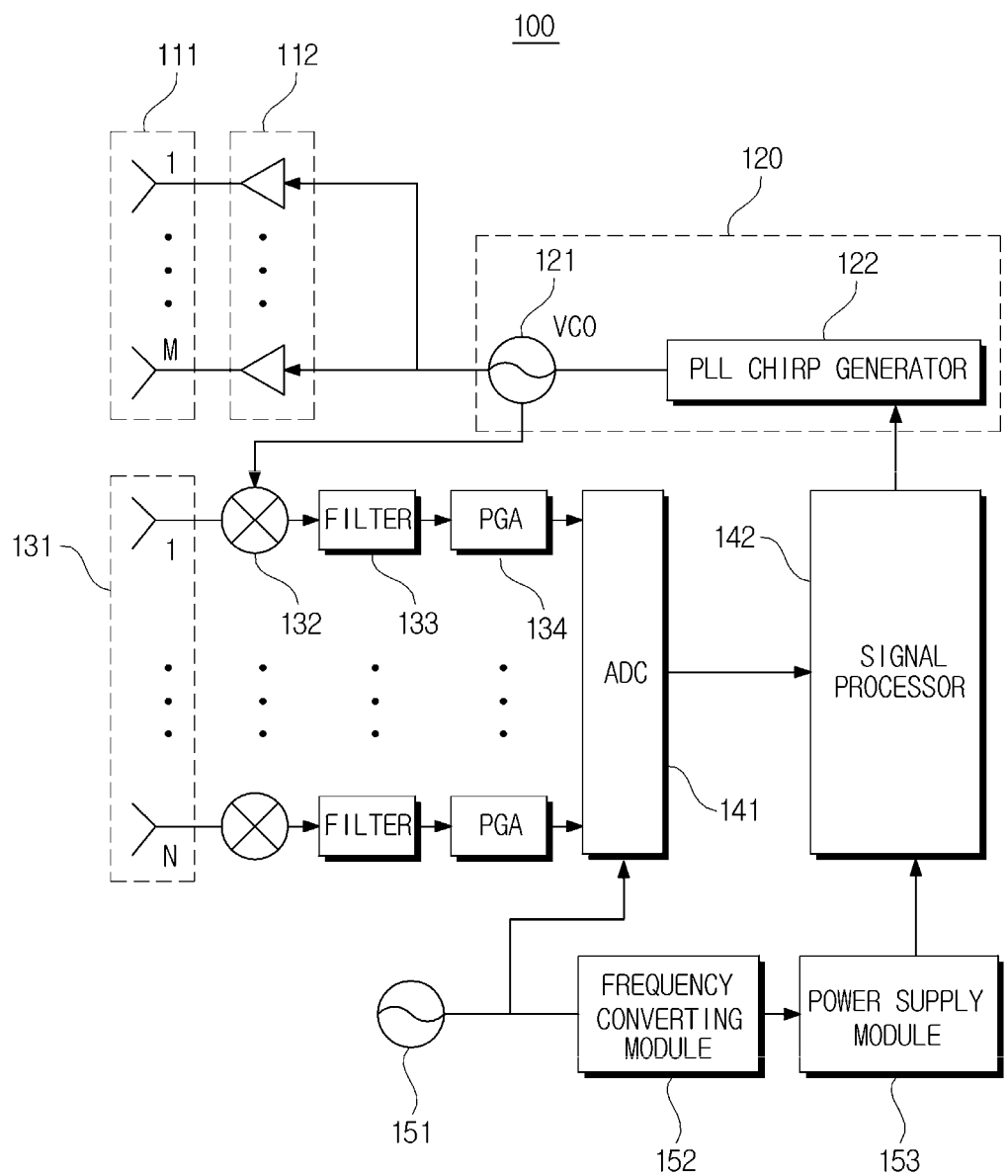
FIG. 1 is a conceptual diagram illustrating a radar system according to an exemplary embodiment of the present invention.

Hereinafter, exemplary embodiments of the present invention will be described in detail with reference to the accompanying drawings. In the figures, even though the parts are illustrated in different drawings, it should be understood that like reference numbers refer to the same or equivalent parts of the present invention throughout the several figures of the drawing. Furthermore, when it is judged that specific description on known configurations or functions related in the description of the present invention may unnecessarily obscure the essentials of the present invention, the detailed description will be omitted. Furthermore, hereinafter, exemplary embodiments of the present invention will be described. However, it should be understood that the technical spirit of the invention is not limited to the specific embodiments, but may be changed or modified in various ways by those skilled in the art.

The present invention relates to a method and an apparatus for reducing a probability of erroneous detection of a frequency modulated continuous wave (FMCW) radar system including a power supply module which operates at a switching frequency.

The FMCW radar is currently used as a necessary element for various intelligent vehicle technologies such as a smart parking assistance system (SPAS), a lane keeping assistance system (LKAS), or a smart cruise control (SCC) system and is continuously being studied and developed.

Such an FMCW radar detects from a near target to a far distance target in accordance with a used frequency domain to obtain and provide information for adjusting a speed of the vehicle and a distance and applicability thereof may be further broaden.

In order to detect a precise position of an object to be detected, the FMCW radar uses information on a frequency domain with a predetermined bandwidth which is transmitted from an RF module to a signal processing module. In the related art, since the bandwidth of the used frequency domain is not so broad, a component of the switching frequency which is generated in a power supply module can be ignored. However, in recent years, as the bandwidth is gradually increased, the switching frequency is included in the frequency domain which is used in the FMCW radar. When the switching frequency component invades the frequency domain used in the FMCW radar, a probability of erroneous detection is increased and an erroneous warning for a target which does not actually exist is generated to threat safety of a passenger.

Therefore, the present invention suggests a method and an apparatus which move the switching frequency component to an odd-number multiple of a Nyquist frequency which is the most ignorable in the frequency domain which is used in the FMCW radar, thereby preventing the erroneous detection due to the switching frequency in the FMCW.

The present invention has advantages in that the FMCW radar makes the most of the sampling frequency and an ADC clock signal which already exists is used without using an additional source for generating a frequency to divide or multiply a frequency, so that additional cost is reduced.

Further, clock sources of a plurality of elements are unified to reduce deterioration which is additionally generated due to EMC and desynchronization.

Hereinafter, an exemplary embodiment of the present invention will be described in detail with reference to the drawings.

FIG. 1 is a conceptual diagram illustrating a radar system according to an exemplary embodiment of the present invention.

FIG. 1 is a diagram of a radar system illustrating a structure using basic configurations 111 to 142 and 153, an ADC clock source 151, and a frequency converting module 152 according to a first exemplary embodiment of the present invention.

As illustrated in FIG. 1, the radar system 100 according to the first exemplary embodiment of the present invention includes M transmitting antennas 111, N receiving antennas 131, M amplifiers 121, an RF frequency generating module 120, a mixer 132, a filter 133, a programmable gain amplifier (PGA) 134, an analog to digital converter 141, a signal processor 142, an ADC clock source 151, a frequency converting module 152, and a power supply module 153.

The M transmitting antennas 111 transmit a high frequency band electromagnetic wave to detect a surrounding object.

The N receiving antennas 131 receives a reflected wave which is reflected from a target to return.

The M amplifiers 112 amplifies a signal which is transmitted to the transmitting antennas 111.

The RF frequency generating module 120 generates a reference frequency to provide the reference frequency to the amplifier 112, the mixer 132, and the signal processor 142.

The RF frequency generating module 120 includes a voltage control oscillator (VCO) 121, a phase lock loop (PLL), and a chirp generator. A PLL and chirp generator 122 refers a configuration in which the PLL and the chirp generator are coupled.

The chirp generator determines a waveform of the FMCW radar which is transmitted through the transmitting antenna and the waveform is generated in the VCO 121 which generates the reference frequency.

The PLL fixes a phase of the reference frequency to allow the VCO 121 to stably generate a frequency.

The mixer 132 extracts a beat signal which contains information on targets in a region which is detected by the radar using a difference between the reflected wave and the reference frequency. Here, the reflected wave and the electromagnetic wave are transmitting and receiving band (high frequency band) of the radar and the beat signal includes information of base band frequencies.

The filter 133 removes a noise in the beat signal by filtering the beat signal.

The PGA 134 amplifies the beat signal at an amplification gain in accordance with a predetermined setting.

The ADC 141 transmits amplitude data, which is obtained by converting an amplitude of the amplified beat signal into a digital signal, to the signal processor 142.

The ADC clock source 151 is a reference clock required to sample the ADC 141.

The power supply module 153 supplies power to the signal processor 141 and the RF frequency generating module 120 of the radar system 100.

The frequency converting module 152 receives a single frequency signal of the ADC clock source 151 and divides or multiplies the single frequency component signal with a signal having only a single frequency component which is an odd-number multiple of the Nyquist frequency, and then the power supply module 153 operates with the switching frequency based on the divided signal or the multiplied signal. A frequency component of the switching signal of the power supply module 153 which is changed by the frequency converting module 152 is located at a frequency which does not act as a noise on the beat signal or may cause the least adverse influence, thereby removing or minimizing the adverse influence on the performance of the FMCW radar system due to the switching signal.

Figure 2:
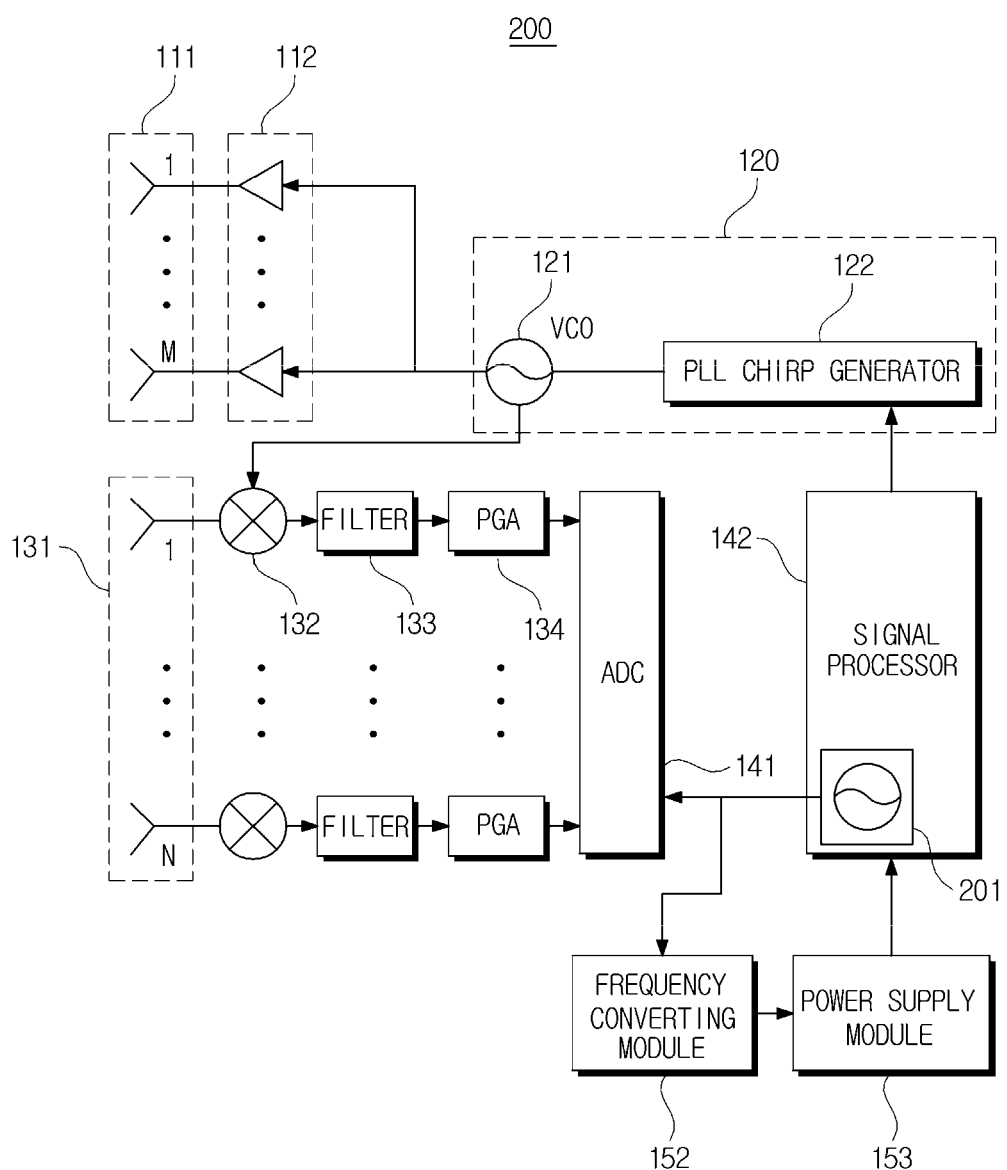
FIG. 2 is a conceptual diagram illustrating a radar system according to another exemplary embodiment of the present invention.

FIG. 2 is a conceptual diagram illustrating a radar system according to another exemplary embodiment of the present invention.

Similarly to FIG. 1, FIG. 2 is a diagram of a radar system illustrating a structure using basic configurations 111 to 142 and 153, an ADC clock source 201, and a frequency converting module 152 according to a second exemplary embodiment of the present invention.

As illustrated in FIG. 2, the radar system 200 according to the second exemplary embodiment of the present invention includes M transmission antennas 111, N reception antennas 131, M amplifiers 112, an RF frequency generating module 120, a mixer 132, a filter 133, a programmable gain amplifier (PGA) 134, an analog to digital converter 141, a signal processor 142, an ADC clock source 201, a frequency converting module 152, and a power supply module 153.

A difference between the radar system 200 according to the second exemplary embodiment of the present invention and the radar system 100 according to the first exemplary embodiment of the present invention is that the ADC clock source 201 is provided in the signal processor 142 in the radar system 200 according to the second exemplary embodiment.

Functions of other components are the same as the functions described with reference to FIG. 1.

The ADC clock source (or an ADC clock output) 201 is used as a reference clock of the ADC sampling frequency. The ADC clock source 201 is located in the signal processor 142 and also transmits a clock signal having a single frequency component to the frequency converting module 152.

In the meantime, Equation of a Nyquist frequency in accordance with a sampling frequency used in the ADC 141 of the FMCW radar according to the exemplary embodiment of the present invention is as follows:

$$f_{Nyquist} = \tfrac{1}{2} \times f_{sampling}$$

In Equation, $f_{Nyquist}$ refers to a Nyquist frequency and $f_{sampling}$ refers to a sampling frequency of the ADC 141.

According to Nyquis Theorem, a Nyquist frequency is half the sampling frequency in a maximum frequency domain which is available for the FMCW radar.

Figure 3:
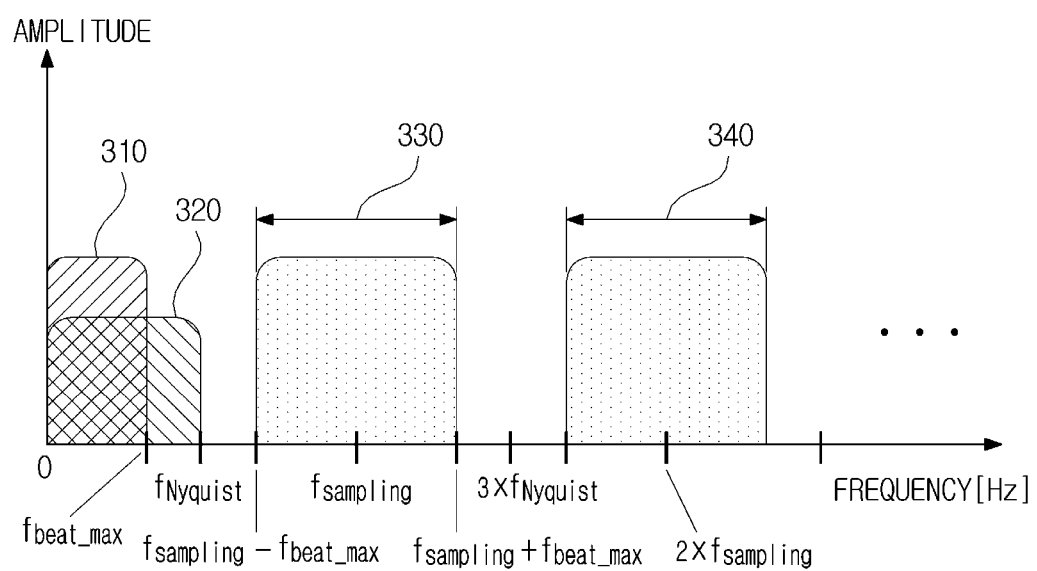
FIG. 3 is a frequency domain view illustrating a frequency domain which is used in an FMCW radar according to an exemplary embodiment of the present invention.

FIG. 3 is a view of a frequency domain illustrating a frequency domain which is used in an FMCW radar according to an exemplary embodiment of the present invention.

FIG. 3 is a view of a frequency domain illustrating a frequency domain which is used by the beat signal of the FMCW radar according to an exemplary embodiment of the present invention.

In FIG. 3, an x-axis is a frequency and a y-axis is an amplitude domain. $f_{beat\_max}$ refers to a maximum value of the frequency range used by the beat signal and $f_{sampling}$ refers to a sampling frequency of the ADC. $f_{Nyquist}$ refers to a Nyquist frequency in accordance with the sampling frequency and an aliasing band refers to a frequency domain which may influence on the beat signal.

When a frequency domain 310 which is used in the FMCW and a frequency domain 320 which is available in the FMCW radar are as illustrated in FIG. 3, a maximum frequency which is used by the beat signal of the FMCW radar is $f_{beat\_max}$ and it should be $f_{beat\_max} = f_{Nyquist}$. Aliasing bands 330 and 340 which are prohibition domains are generated in accordance with $f_{beat\_max}$. Widths of the aliasing bands 330 and 340 are $2 \times f_{beat\_max}$ and a center axis is an integer multiple of $f_{sampling}$. When a signal other than the beat signal exists in the domain of the aliasing bands 330 and 340, the signal acts as a noise on the beat signal which may cause erroneous detection of the FMCW radar.

Figure 4:
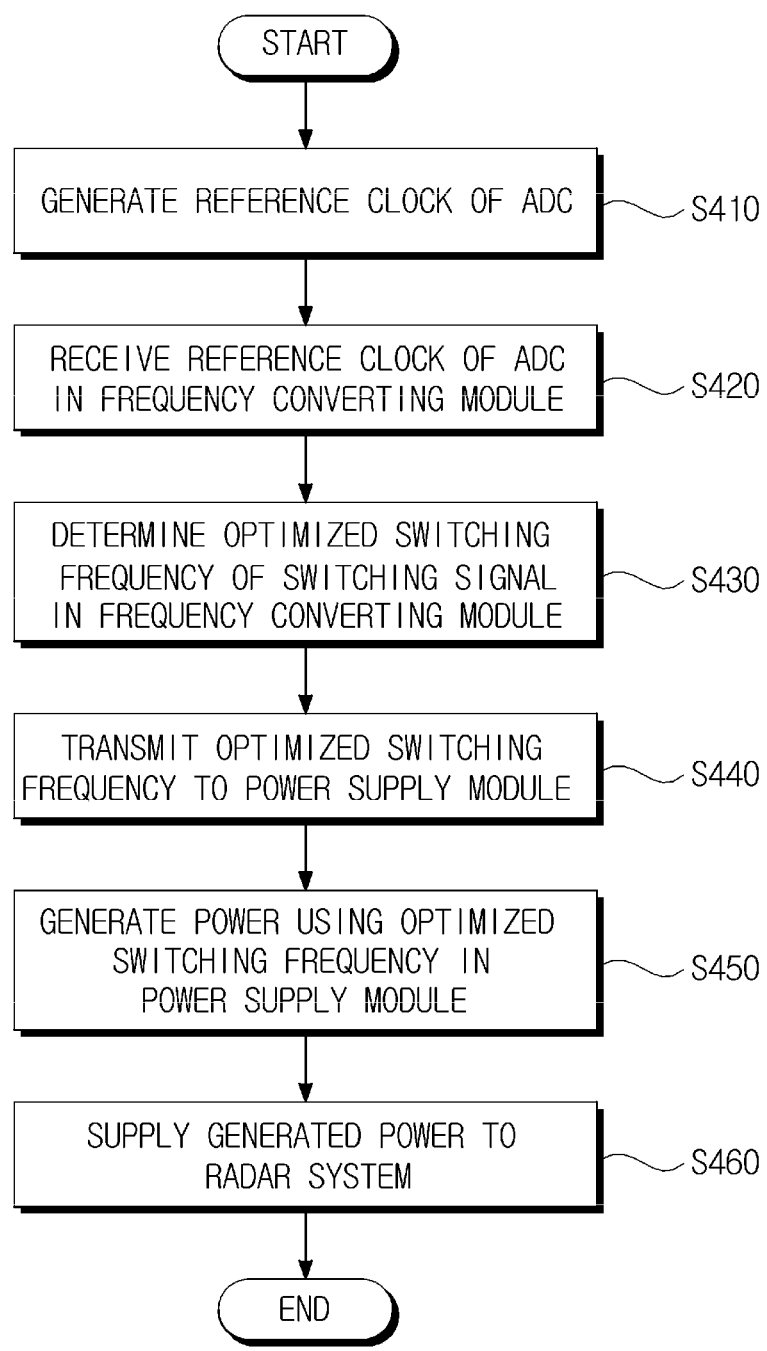
FIG. 4 is a flowchart illustrating a first operating method of a radar system according to an exemplary embodiment of the present invention.

FIG. 4 is a flowchart illustrating a first operating method of a radar system according to an exemplary embodiment of the present invention.

FIG. 4 is a flowchart of a method which processes the reference clock signal of the ADC in the frequency converting module 152 according to the exemplary embodiment of the present invention to determine an optimized switching frequency. Hereinafter, FIG. 4 will be described with the configuration of FIG. 1, but the configuration of FIG. 2 may be also applicable.

First, the ADC clock source 151 generates a reference clock of the ADC in step S410.

Next, the frequency converting module 152 receives the reference clock of the ADC in step S420.

Next, the frequency converting module 152 determines an optimized switching frequency of the switching signal in step S430.

Next, the frequency converting module 152 transmits the optimized switching frequency to the power supply module 153.

Next, the power supply module 153 generates power using the optimized switching frequency in step S450.

Next, the power supply module 153 supplies the generated power to individual components of the radar system 100.

Figure 5:
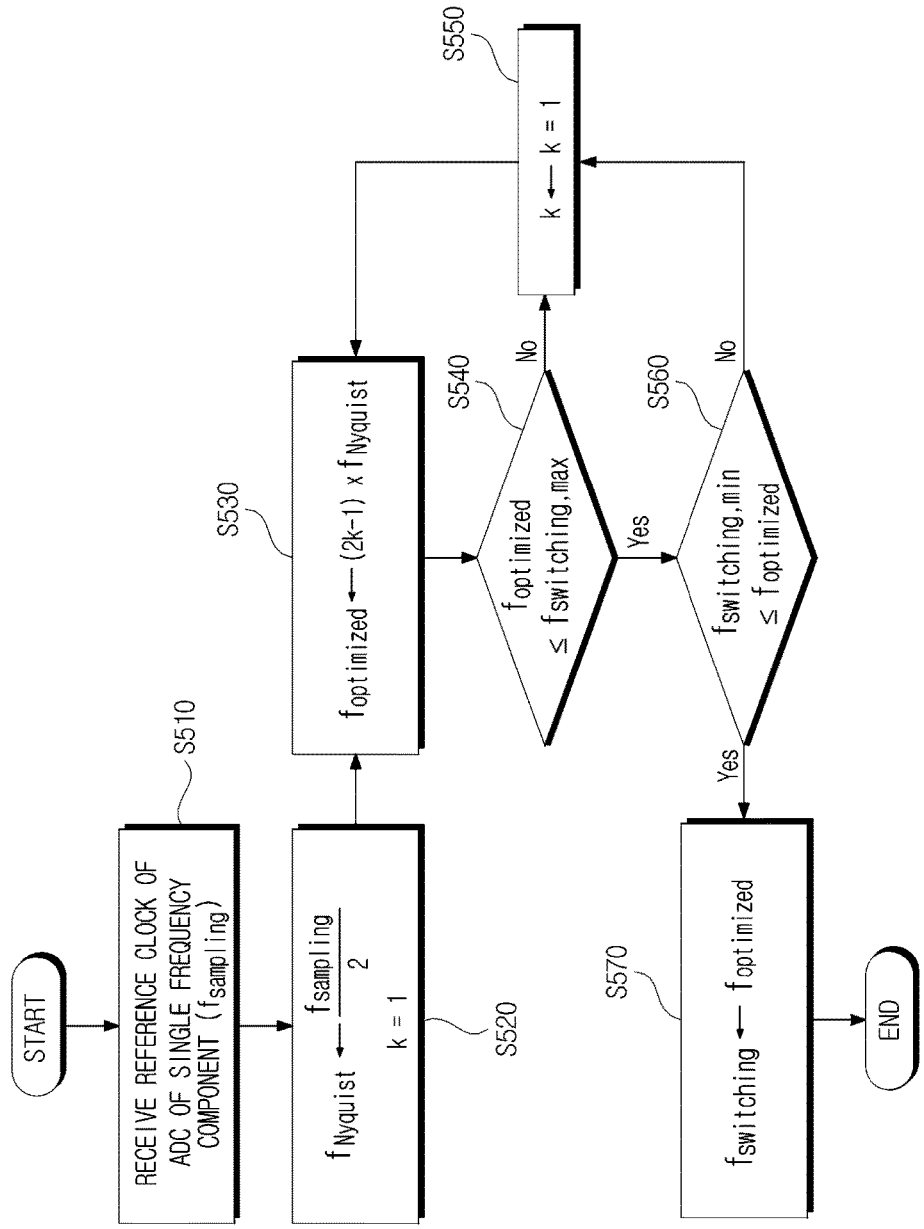
FIG. 5 is a flowchart illustrating a second operating method of a radar system according to an exemplary embodiment of the present invention.

FIG. 5 is a flowchart illustrating a second operating method of a radar system according to an exemplary embodiment of the present invention.

FIG. 5 is a flowchart that the reference clock signal of the ADC 141 is input to an input of the frequency converting module 152, according to the exemplary embodiment of the present invention, to dispose the switching frequency to be an odd number multiple of the Nyquist frequency. Hereinafter, FIG. 4 will be described with the configuration of FIG. 1, but the configuration of FIG. 2 may be also applicable.

The frequency converting module 152 receives a reference clock of the ADC having a single frequency component in step S510.

Next, the frequency converting module 152 starts at a Nyquist frequency $f_{Nyquist}$ which is half the sampling frequency in step S520.

Next, the frequency converting module 152 calculates an odd number multiple of $f_{Nyquist}$ as $f_{optimized}$ in step S530.

Next, the frequency converting module 152 compares $f_{optimized}$ and $f_{switching,max}$ in step S540. $f_{switching,min}$ and $f_{switching,max}$ are determined in advance. $f_{switching,min}$ refers to a minimum value of the switching frequency which is available in the power supply module 153 and $f_{switching,max}$ refers to a maximum value of the switching frequency which is available in the power supply module 153.

When it is determined that $f_{optimized}$ is larger than $f_{switching,max}$ the frequency converting module 152 increments a k value in step S550 to repeat step S530.

In contrast, when it is determined that $f_{optimized}$ is equal to or smaller than $f_{switching,max}$, the frequency converting module 152 compares $f_{optimized}$ and $f_{switching,max}$ in step S540.

When it is determined that $f_{optimized}$ is equal to or larger than $f_{switching,max}$, the frequency converting module 152 determines $f_{optimized}$ as a switching frequency in step S570.

In contrast, when it is determined that $f_{optimized}$ is smaller than $f_{switching,max}$, the frequency converting module 152 performs step S550 again.

In the meantime, the frequency converting module 152 repeatedly performs step S520 to S570 several times while changing the k value to determine the least frequency in a combination which is larger than $f_{switching,min}$ and smaller than $f_{swtiching,max}$, among the odd number multiple of $f_{Nyquist}$, as a switching frequency.

In the meantime, the following Equation relates to a method of calculating switching frequencies which may be applied by changing the input ADC clock signal by the frequency converting module 152.

$$f_{switching} = f_{sampling}/2 \times (2k-1) = f_{Nyquist} \times (2k-1)$$

The switching frequency $f_{switching}$ is determined as an odd number multiple of half of the sampling frequency $f_{sampling}$ or an odd number multiple of the Nyquist frequency. k is a natural number and the simplest circuit configuration may be obtained when k=1.

Figure 6:
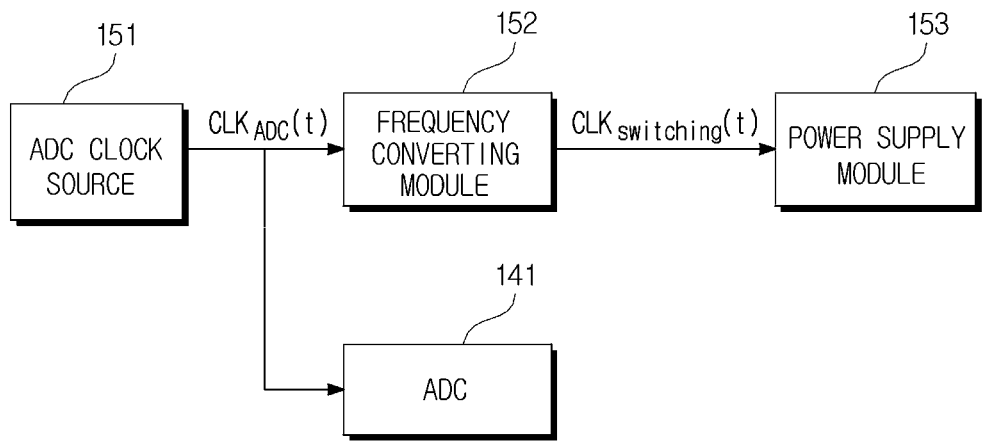
FIG. 6 is a conceptual view illustrating an internal configuration of a power control system which configures a radar system according to an exemplary embodiment of the present invention.

FIG. 6 is a conceptual view illustrating an internal configuration of a power control system which configures a radar system according to an exemplary embodiment of the present invention.

FIG. 6 is a block diagram of a frequency converting module 152 in which the reference clock signal of the ADC is input to an input of the frequency converting module 152 to convert the switching frequency into the odd number multiple of the Nyquist frequency.

In the ADC clock source 151 or 201 which is a module of generating an ADC reference clock, a periodic signal only having a single frequency component $f_{sampling}$ is transmitted to the ADC 141 and the frequency converting module 152. $CLK_{ADC}(t)$ refers to an ADC reference clock signal.

The frequency converting module 152 converts the ADC reference clock signal into an optimized signal having only one of odd number multiple frequencies of the Nyquist frequency which is half $f_{sampling}$ as a frequency component and transmits the converted signal to the power supply module 153. $CLK_{switching}(t)$ refers to a periodic signal only having a switching frequency optimized by the frequency converting module 152 as a single frequency component.

The power supply module 153 generates power at an optimized switching frequency using a signal received from the frequency converting module 152 to supply the power to the radar system.

Figure 7:
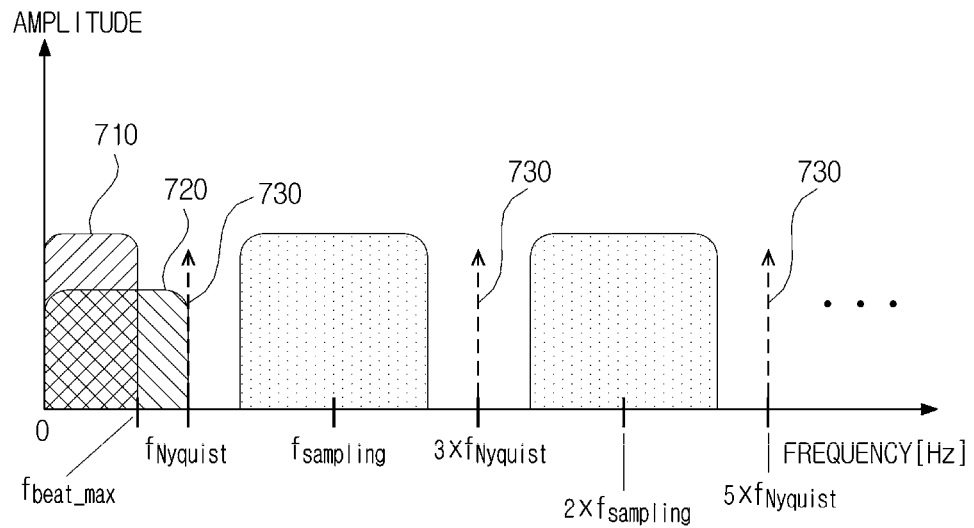
FIG. 7 is a first frequency domain view illustrating a frequency domain where a switching frequency of a power supply module is located, according to an exemplary embodiment of the present invention.

FIG. 7 is a first frequency domain view illustrating a frequency domain where a switching frequency of a power module is located, according to an exemplary embodiment of the present invention.

The switching frequency is changed into a frequency obtained by dividing the frequency of the ADC clock signal input to the frequency converting module 152 by two and then multiplying by odd number multiple. Reference numeral 710 refers to a frequency domain which is used in the FMCW radar, reference numeral 720 refers to a frequency domain which is available in the FMCW radar, and reference numeral 730 refers to an available switching frequency according to the present invention.

In FIG. 7, since not all the available frequency domain is used in the FMCW radar, the switching frequency is located at $f_{Nyquist}$, which does not cause erroneous detection in the FMCW radar. Therefore, the detection precision of the FMCW radar is improved and even when phenomenon due to the frequency shaking of the switching frequency is generated, the phenomenon may not affect the detection performance.

Figure 8:
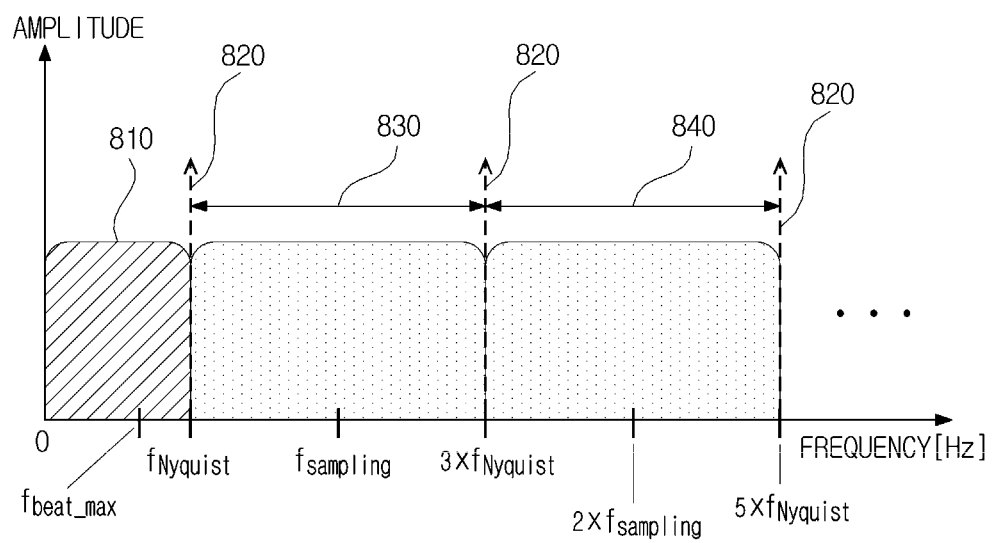
FIG. 8 is a second frequency domain view illustrating a frequency domain where a switching frequency of a power supply module is located, according to an exemplary embodiment of the present invention.

FIG. 8 is a second frequency domain view illustrating a frequency domain where a switching frequency of a power module is located, according to an exemplary embodiment of the present invention.

FIG. 8 is a view of a frequency domain where the switching frequency of the power supply module 152 is located when all available frequency domains are used at the sampling frequency provided in the FMCW radar, according to the exemplary embodiment of the present invention.

This case means that when the converting frequency uses the frequency domain to $f_{Nyquist}$ in the FMCW radar. In this case, the position 820 of the switching frequency may not be set to be distant from the domain which is used in the FMCW radar. Reference number 810 refers to a frequency used in the FMCW radar and reference numbers 830 and 840 refer to an aliasing band 1 and an aliasing band 2.

In the exemplary embodiment of the present invention, the frequency converting module 153 designates fNyquist which the least affects on the detecting performance of the radar as the switching frequency, so that the probability of erroneous detection caused by the switching frequency may be the lowest.

The exemplary embodiment of the present invention has been described above with reference to FIGS. 1 to 8. Hereinafter, differences between the related art and the present invention will be described again.

First, no switching frequency exists in a frequency domain where data exists so that erroneous detection rate of the radar sensor is reduced.

Further, multiple high angle (vertical direction) alignment is possible.

Further, multiple correcting targets are used so as to compare reception vertical angles of signals which are input at various angles to calculate an angle to be corrected, and thus the prediction may be allowed at high reliability.

Second, differently from the related art, only one IC which divides or converts an input frequency by $(f_{sampling}/2) \times (2k-1)$ (k is a natural number) is used.

The frequency component which is input to the divider as an input is a signal which is necessarily used in the radar sensor and a signal having a single frequency component which is input to the ADC to be used as a sampling frequency of the ADC is used in the present invention. Therefore, an additional module which generates a frequency in a broader range is not necessary and only a module which divides the frequency by 2 and then multiplies the frequency to be odd number multiple is necessary.

Further, a necessary H/W structure is simplified, to reduce production cost, reduce a size of the radar, and reduce the complexity.

Third, optimization is generated when $f_{beat\_max} = f_{Nyquist}$, and all the Nyquist frequency domains are used to perform the radar signal processing, so that data loss in the frequency domain is minimized.

In the related art, more complex and expensive clock oscillator is necessary when $f_{beat\_max} = f_{Nyquist}$. However, in the present invention, regardless of the range of $f_{beat\_max}$, one IC which divides the frequency by 2 or one IC which multiples the frequency to be odd number multiple is sufficient.

Further, when the switching frequency is oscillated, in the related art, the location of the frequency is not fixed, so that the erroneous detection may occur. However, in the present invention, the switching frequency is located at all times at $f_{Nyquist}$, so that low probability of erroneous detection may be solidly secured.

Fourth, the clock signal which is used in the radar sensor is also used as a switching frequency of the power supply.

In the radar sensor, all ICs operate by the single clock signal so that the EMC and the system stability may be improved.

Fifth, the present invention may be used to be applied to the FMCW radar sensor and improve the performance and a probability of erroneous operation in the entire system may be reduced through synchronization of clocks.

Therefore, the present invention suggests a method and an apparatus which switch the switching frequency component generated in the power supply module to odd-number times of a Nyquist frequency which is the most ignorable in the frequency domain which is used for the FMCW radar, thereby preventing the erroneous detection due to the switching frequency in the FMCW.

In the related art, since the bandwidth of the used frequency domain is not so broad, a component of the switching frequency which is generated in a power supply module can be ignored. However, in recent years, as the bandwidth is gradually increased, the switching frequency is included in the frequency domain which is used for the FMCW radar.

According to the present invention, the FMCW radar uses the sampling frequency at most, so that there is no waste. Further, for the purpose of mass production, an ADC clock signal which is already provided is used to divide or multiply the frequency without providing an additional source to generate a frequency, so that additional cost may be reduced. Further, clock sources of a plurality of elements are unified, to reduce deterioration which is additionally generated due to the EMC and desynchronization.

Lastly, in a system in which the sampling frequency is continuously changed, the method may contribute to improve the performance so that when the sampling frequency is changed to detect various distances in one radar, the method is essential.

The exemplary embodiment of the present invention has been described above with reference to FIGS. 1 to 8. Hereinafter, an exemplary embodiment of the present invention which may be deducted from the exemplary embodiment will be described below.

A power supply control apparatus of a vehicle radar according to an exemplary embodiment of the present invention includes a first frequency signal generating unit, a second frequency signal obtaining unit, a power supply control unit, a power supply, and a main control unit.

The power supply supplies power to individual components of the power supply control device of the vehicle radar. The main control unit controls overall operation of the individual components of the power supply control device of the vehicle radar. When it is considered that the power supply control device of the vehicle radar is provided in the vehicle, the power supply and the main control unit may be implemented by a vehicle battery and an MCU (or an ECU), so that in the exemplary embodiment, the power supply and the main control unit may not be provided.

The first frequency signal generating unit generates a first frequency signal with a predetermined amplitude. The first frequency signal generating unit is a concept corresponding to the ADC clock sources 151 and 201 of FIGS. 1 and 2.

The first frequency signal generating unit configures the vehicle radar and may be provided in the signal processor which processes frequency signals generated in the vehicle radar. Further, the first frequency signal generating unit may be provided separately from the vehicle radar.

The first frequency signal generating unit may be implemented as a clock source for sampling of the analog to digital converter which configures the vehicle radar.

The second frequency signal obtaining unit changes the frequency value of the first frequency signal to obtain a second frequency signal. The second frequency signal obtaining unit is a concept corresponding to the frequency converting module 152 of FIG. 1.

The second frequency signal obtaining unit divides or multiples the frequency to convert the frequency value of the first frequency signal to generate sampling frequencies and obtain a second frequency signal.

The second frequency signal obtaining unit divides the frequency of the first frequency signal at odd number times or multiples the frequency at the odd number times to generate the sampling frequencies.

The second frequency signal obtaining unit may generate the Nyquist frequency as sampling frequencies.

The second frequency signal obtaining unit may detect intermediate frequencies having an intermediate value between the maximum value and the minimum value among the sampling frequencies and obtain the second frequency signal based on the frequency having the minimum value among the intermediate frequencies.

The power supply control unit controls the power to operate the vehicle radar based on the second frequency signal. The power supply control unit is a concept corresponding to the power supply module 153 of FIG. 1.

Next, an operating method of a power supply control device of a vehicle radar will be described.

First, the first frequency signal generating unit generates a first frequency signal with a predetermined amplitude.

Next, the second frequency signal obtaining unit converts the frequency value of the first frequency signal to obtain a second frequency signal.

Next, the power supply control unit controls the power supply to operate the vehicle radar based on a second frequency signal.

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The recording media of the computer program may include a magnetic recording medium, an optical recording medium, or a carrier wave medium.

If it is not contrarily defined in the detaned description, all terms used herein including technological or scientific terms have the same meaning as those generally understood by a person with ordinary skill in the art. A generally used terminology which is defined in a dictionary may be interpreted to be equal to a contextual meaning of the related technology but is not interpreted to have an ideal or excessively formal meaning, if it is not apparently defined in the present invention.

The above description is illustrative purpose only and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the scope of the present invention.

What is claimed is:

1. A power control apparatus of a vehicle radar, comprising:
    a first frequency signal generating unit which generates a first frequency signal with a predetermined amplitude;
    a second frequency signal generating unit which converts a frequency value of the first frequency signal to generate a second frequency signal; and
    a power supply control unit which controls a power supply to operate the vehicle radar based on the second frequency signal,
    wherein the second frequency signal generating unit divides the frequency value of the first frequency signal at an odd number of times or multiplies the frequency value of the first frequency signal at an odd number of times, thereby generating a plurality of sampling frequency signals, and
    wherein the second frequency signal generating unit detects intermediate frequencies each having an intermediate value between a maximum value and a minimum value among frequencies of the plurality of sampling frequency signals, and generates the second frequency signal based on sampling frequency signals having the detected intermediate frequencies among the plurality of sampling frequency signals.

2. The power control apparatus of claim 1, wherein the first frequency signal generating unit is provided in a signal processor, which is included in the vehicle radar and processes frequency signals generated in the vehicle radar, or the first frequency signal generating unit is provided separately from the vehicle radar.

3. The power control apparatus of claim 1, wherein the first frequency signal generating unit is a clock source for sampling an analog to digital converter included in the vehicle radar.

4. The power control apparatus of claim 1, wherein the second frequency signal generating unit generates a Nyquist frequency signal using the plurality of sampling frequency signals.

5. The power control apparatus of claim 1, wherein the second frequency signal generating unit generates the second frequency signal based on a sampling frequency signal having a minimum value among the intermediate frequencies.

6. A power control method of a vehicle radar, comprising:
    generating a first frequency signal with a predetermined amplitude;
    converting a frequency value of the first frequency signal to generate a second frequency signal; and
    controlling a power supply to operate the vehicle radar based on the second frequency signal,
    wherein the generating of the second frequency signal includes generating a plurality of sampling frequency signals by dividing the frequency value of the first frequency signal at an odd number of times or multiplying the frequency value of the first frequency signal at an odd number of times, and
    wherein the generating of the second frequency signal further includes detecting intermediate frequencies having an intermediate value between a maximum value and a minimum value among frequencies of the plurality of sampling frequency signals, and generating the second frequency signal based on the sampling frequency signals having the detected intermediate frequencies among the plurality of sampling frequency signals.

7. The power control method of claim 6, wherein the generating of the first frequency signal includes generating the first frequency signal using a clock source for sampling an analog to digital converter included in the vehicle radar.

8. The power control method of claim 6, wherein the generating of the second frequency signal includes generating a Nyquist frequency signal using the plurality of sampling frequency signals.

9. The power control method of claim 6, wherein the generating of the second frequency signal includes generating the second frequency signal based on a sampling frequency signal having a minimum value among the intermediate frequencies.

10. A power control apparatus of a vehicle radar, comprising:
- a first frequency signal generating unit which generates a first frequency signal with a predetermined amplitude;
- a second frequency signal generating unit which converts a frequency value of the first frequency signal to generate a second frequency signal; and
- a power supply control unit which controls a power supply to operate the vehicle radar based on the second frequency signal,
- wherein the first frequency signal generating unit is provided in a signal processor, which is included in the vehicle radar and processes frequency signals generated in the vehicle radar, or the first frequency signal generating unit is provided separately from the vehicle radar,
- wherein the second frequency signal generating unit generates a plurality of sampling frequency signals by sampling the frequency value of the first frequency signal at a number of times, and
- wherein the second frequency signal generating unit detects intermediate frequencies having an intermediate value between a maximum value and a minimum value among frequencies of the plurality of sampling frequency signals, and generates the second frequency signal based on sampling frequency signals having the detected intermediate frequencies among the plurality of sampling frequency signals.

11. The power control apparatus of claim 10, wherein the first frequency signal generating unit is a clock source for sampling an analog to digital converter included in the vehicle radar.

12. The power control apparatus of claim 10, wherein the second frequency signal generating unit generates a Nyquist frequency signal using the plurality of sampling frequency signals.

13. The power control apparatus of claim 10, wherein the second frequency signal generating unit generates the second frequency signal based on a sampling frequency signal having a minimum value among the intermediate frequencies.

* * * * *